E. E. STEVENSON.
AUTOMATIC WATER VALVE.
APPLICATION FILED MAR. 27, 1917.

1,237,725.

Patented Aug. 21, 1917.

Inventor
Edward E. Stevenson,
by his Attorney.

UNITED STATES PATENT OFFICE.

EDWARD E. STEVENSON, OF VENICE, CALIFORNIA, ASSIGNOR OF ONE-HALF TO L. G. BAER, OF VENICE, CALIFORNIA.

AUTOMATIC WATER-VALVE.

1,237,725.

Specification of Letters Patent. Patented Aug. 21, 1917.

Application filed March 27, 1917. Serial No. 157,649.

*To all whom it may concern:*

Be it known that I, EDWARD E. STEVENSON, a citizen of the United States, residing at Venice, in the county of Los Angeles, State of California, have invented new and useful Improvements in Automatic Water-Valves, of which the following is a specification.

This invention relates to automatic water valves for use particularly in watering poultry, rabbits, dogs or other small animals, the main object of which is to keep a maximum quantity of water in a trough, and, when that certain maximum amount of water is in the trough, to cut off automatically, the supply of water. This application is in part a continuation of my application S. N. 92,417, filed April 20th, 1916.

In its essentials, my device includes a valve orifice, a washer pivotally movable against said orifice, said washer mounted on one end of a lever, and the other end of said lever holding the water trough, the weight of which counter balances the pressure of water at the orifice. In my invention the weight of water in the trough acts as a balance against the water pressure; thus, when the quantity of water in the trough is not of such weight as to close the valve, water will drip through the valve into the trough until such weight balances the water pressure and this action closes the valve.

A feature of my device is that in practice a balance is maintained so that the water never runs into the trough, when the device is in use, but drips therein at a slow rate until the maximum quantity of water is attained in the trough; another feature is this, that to suit different pressures, I cut notches in the end of the arm holding the trough, so that the trough may be placed in such a notch so that its weight balances the pressure of water when a certain predetermined maximum quantity of water has run into the trough. There are various other features explained in the following specification.

Figure 1:
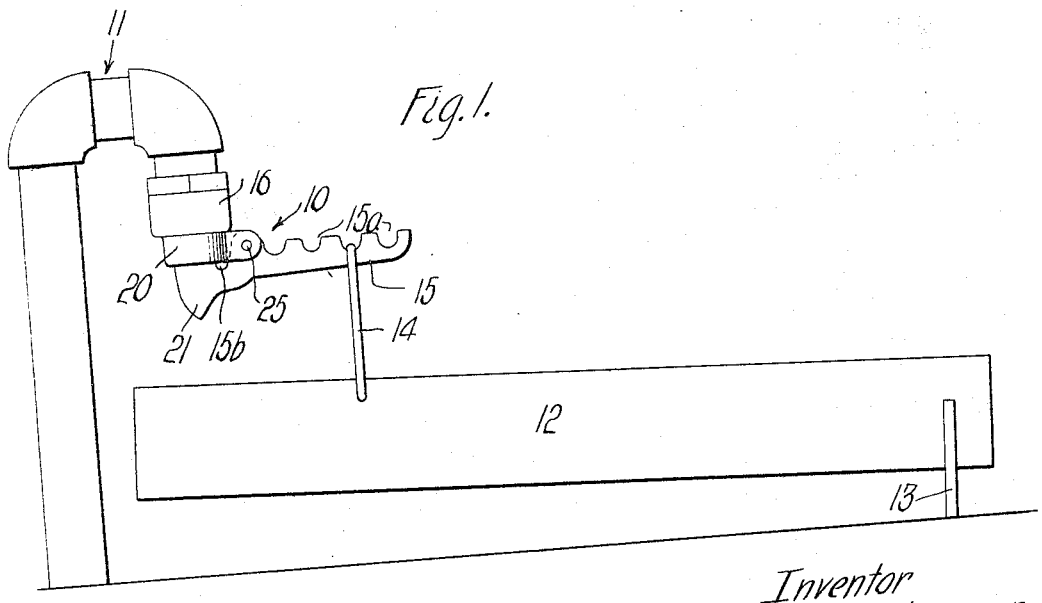

In the drawings I have shown in detail a preferred specific form of my invention, in which drawings; Figure 1 is a view showing my valve attached to an ordinary pipe connection and holding a trough thereon, Fig. 2 is a longitudinal section of the valve proper and Fig. 3 is an end view thereof.

In the drawings the numeral 10 designates generally my automatic water valve fitting which may be attached to any pipe or other connection 11 in the manner shown. The valve fitting consists mainly of a body having a screw threaded connection 16 for connection to a water pipe, a screen 17 resting at the seat of the screw threaded connection to prevent dirt, etc., from accumulating in the orifice 18. A rubber, cork, leather or other washer valve 19 is snugly set in aperture 19$^a$ in one end of the lever 15, which lever is pivoted to valve body 26 by pin 25 so as to swing thereon. The outer end of the lever 15 has notches 15$^a$ which are adapted to hold wire bail 14 supporting trough 12. Bail 14 is attached to one end of the trough 12, the other end standing on member 13 which rests on the ground, in the manner shown in Fig. 1. It will be noted that the fulcrum pin 25, notches 15$^a$, and upper surface of washer 19 are all approximately in the same plane so that the washer is maintained in proper engagement with the seat.

Figure 2:
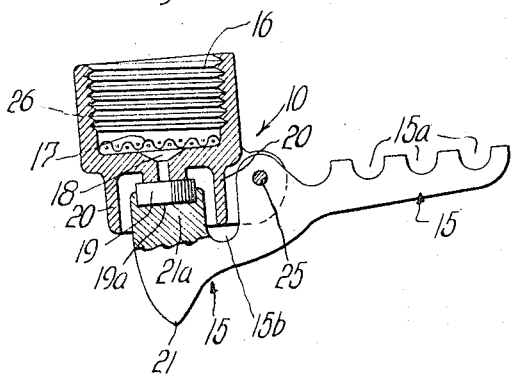
Figure 3:
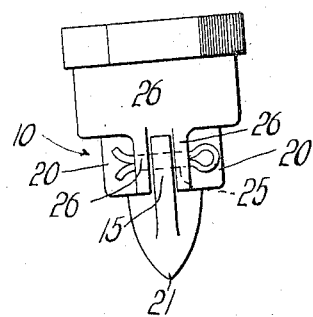

As shown particularly in Fig. 2, I make the valve end of the lever 15 with a preferably acorn shaped downward projection as shown at 21, and also an upward projection 21$^a$ extending up into the collar to carry the valve washer; and around this upper projection and the washer 19 I place a collar 20 formed on the body 26 of the valve fitting. This collar surrounds the orifice 18 and projects downwardly to prevent the water from spraying horizontally away from the trough, confining it to run down on the projection 21, and the projection 21 is made of such configuration so as to concentrate the drip or run of water at its lowest point. This insures the water always dropping into the trough, no matter how slowly the water runs or drips and regardless of the wind, which would tend to blow the water away if it were in a fine spray. The lever 15 has a notch or downward offset at 15^b allowing the collar 20 to be continuous and to completely encircle the washer and to thus wholly concentrate the water upon the projection 21.

In operation the main supply of water to the valve fitting 10 may be left open (the pipe 11 may have a hand valve if desired); when a maximum amount of water is in the trough 12, a sufficient weight is imposed upon the outer end of the lever 15 to seat the valve washer 19 firmly against the opening 18 and thus cut off the supply of water; but, when the water in the trough evaporates, or is used for drinking purposes, and the weight of the trough decreases, then the water pressure forces the water to seep through the opening 18, over valve washer 19 and over acorn shaped end 21 into the trough. In practice, the opposing forces nearly balance one another; if the water slowly evaporates, or is regularly used, the water will keep dripping slowing and regularly from the valve.

The amount and weight of water in the trough, which is counter-balanced against the pressure of water, may be changed with relation to the pressure of the water against the opening, by placing the trough bail either nearer to or farther from the valve and changing the wire bail in the notches, which, of course, gives a different leverage and a change of pressure on the washer.

My device has proven simple and efficient for the purpose set forth, needing no attention and always acting uniformly. To the features that make this simplicity and efficiency I direct the following claims.

Having described a preferred form of my invention, I claim:

1. In a device of the character described, a supply pipe, a cut off valve fitting connected to said supply pipe comprising a body with an outlet and with a fulcrum, a lever pivoted on the fulcrum, one end of said lever holding a washer normally pressing up against said outlet, a collar made integrally with the body of the valve fitting and completely surrounding the said washer and extending downwardly from said valve fitting; an acorn shaped projection extending downwardly on the lever below the washer and under and within the collar, and a water receptacle connected to the other end of said lever.

2. In a device of the character described, a supply pipe, a cut off valve fitting connected to said supply pipe comprising a body with a fulcrum and with a downward outlet, a lever pivoted on said fulcrum, one end of said lever holding a valve washer normally pressing up against said outlet, a collar made integrally with the body of the valve fitting and surrounding the said washer and extending downwardly from said valve fitting; the other end of the lever having spaced notches, a water receptacle, and means for hanging the water receptacle at any one of said notches.

3. In a device of the character described, a supply pipe, a cut off valve fitting connected to said supply pipe comprising a body with a fulcrum and with a downward outlet, a lever pivoted on said fulcrum, one end of said lever holding a valve washer normally pressing up against said outlet, a collar made integrally with the body of the valve fitting and surrounding the said washer and extending downwardly from said valve fitting; the lever having a downward offset to accommodate the collar and having an end part extending up into the space within the collar to carry the washer; the other end of the lever having spaced notches, a water receptacle, and means for hanging the water receptacle at one of said notches.

4. In a device of the character described, a supply pipe, a cut off valve fitting connected to said supply pipe comprising a body with a fulcrum and with a downward outlet, a lever pivoted on said fulcrum, one end of said lever holding a valve washer normally pressing up against said outlet, a collar made integrally with the body of the valve fitting and surrounding the said washer and extending downwardly from said valve fitting; the lever having a downward offset to accommodate the collar and having an end part extending up into the space within the collar to carry the washer; the other end of the lever having spaced notches, a water receptacle, and means for hanging the water receptacle at any one of said notches; the washer, the lever pivot and the lever notches being all approximately in the same plane.

5. In a device of the character described, a supply pipe, a cut off valve fitting connected to said supply pipe comprising a body with a fulcrum and with a downward outlet, a lever pivoted on said fulcrum, one end of said lever holding a valve washer normally pressing up against said outlet, a collar made integrally with the body of the valve fitting and completely surrounding the said washer and extending downwardly from said valve fitting; the lever having a downward offset to accommodate the collar and having an end portion extending up within the collar to carry the washer and having a downward acorn shaped projection below the washer to concentrate the drip of water therefrom under the collar; and the other end of the lever having spaced notches for adjustably suspending a water receptacle below the collar and the acorn shaped projection, the washer, the lever pivot and the notches being all approximately in the same plane.

6. In a device of the character described, a cut off valve fitting having a downward outlet, a lever pivoted on the fitting, a valve on one end of the lever adapted to be pressed up against the outlet, a downward projection on the lever beneath the valve adapted to concentrate the drip of water at its lower end, and a collar on the fitting projecting downwardly around the outlet and surrounding the valve to concentrate the water flowing out of the outlet over the valve.

In witness that I claim the foregoing I have hereunto subscribed my name this 20th day of March, 1917.

E. E. STEVENSON.